United States Patent
Mulchandani

(10) Patent No.: US 9,767,285 B2
(45) Date of Patent: Sep. 19, 2017

(54) PROCESS CATEGORIZATION USING CROWDSOURCING

(71) Applicant: Accenture Global Services Limited, Dublin (IE)

(72) Inventor: Shaan Mulchandani, Arlington, VA (US)

(73) Assignee: Accenture Global Services Limited, Dublin (IE)

(*) Notice: Subject to any disclaimer, the term of this patent is extended or adjusted under 35 U.S.C. 154(b) by 192 days.

(21) Appl. No.: 14/838,634

(22) Filed: Aug. 28, 2015

(65) Prior Publication Data
US 2016/0357964 A1    Dec. 8, 2016

Related U.S. Application Data

(60) Provisional application No. 62/171,072, filed on Jun. 4, 2015.

(51) Int. Cl.
| | | |
|---|---|---|
| G06F 21/56 | (2013.01) | |
| G06F 21/55 | (2013.01) | |
| G06F 21/57 | (2013.01) | |

(52) U.S. Cl.
CPC .......... *G06F 21/566* (2013.01); *G06F 21/554* (2013.01); *G06F 21/556* (2013.01); *G06F 21/57* (2013.01); *G06F 2221/033* (2013.01)

(58) Field of Classification Search
None
See application file for complete search history.

(56) References Cited

U.S. PATENT DOCUMENTS

| | | | | |
|---|---|---|---|---|
| 5,528,513 A | * | 6/1996 | Vaitzblit | ........... H04L 29/06027 348/E7.073 |
| 7,219,347 B1 | * | 5/2007 | Waddington | .......... G06F 9/4881 718/102 |
| 7,669,087 B1 | * | 2/2010 | Johnsen | ................ G06F 11/008 714/13 |
| 7,779,410 B2 | * | 8/2010 | Gebhart | ................ G06F 9/4856 717/177 |

(Continued)

OTHER PUBLICATIONS

International Search Report and Written Opinion in International Application No. PCT/IB2016/052463, mailed Jul. 8, 2016, 11 pages.

*Primary Examiner* — Michael R Vaughan
(74) *Attorney, Agent, or Firm* — Fish & Richardson P.C.

(57) ABSTRACT

Methods, systems, and apparatus, including computer programs encoded on a computer storage medium, for categorizing a process using crowdsourcing are described. The methods include the action of receiving data indicating resources allocated upon execution of each of one or more processes. The methods further include the action of receiving data indicating a configuration of the client device. The methods further include receiving data indicating a user selection whether to execute each of the one or more processes. The methods further include the action of determining a risk score that reflects a likelihood that the process is a malicious process. The methods further include the action of identifying a particular process. The methods further include the action of performing additional processing on the particular process. The methods further include the action of determining an updated risk score for the particular process.

18 Claims, 3 Drawing Sheets

(56) References Cited

U.S. PATENT DOCUMENTS

| | | | |
|---|---|---|---|
| 7,895,650 B1* | 2/2011 | Sobel | G06F 21/554 713/164 |
| 8,171,545 B1 | 5/2012 | Cooley et al. | |
| 8,505,102 B1* | 8/2013 | Cannings | G06F 21/56 713/187 |
| 9,348,999 B2* | 5/2016 | Sugaya | G06F 21/52 |
| 2002/0077913 A1* | 6/2002 | Memmott | G06F 9/54 705/22 |
| 2003/0009744 A1* | 1/2003 | Doyle | G06F 8/423 717/120 |
| 2008/0098478 A1* | 4/2008 | Vaidya | G06F 21/34 726/24 |
| 2009/0165131 A1* | 6/2009 | Treadwell | G06F 21/566 726/22 |
| 2009/0165133 A1* | 6/2009 | Hwang | G06F 21/53 726/22 |
| 2009/0276783 A1* | 11/2009 | Johnson | G06F 9/5077 718/104 |
| 2009/0328209 A1 | 12/2009 | Nachenberg | |
| 2011/0067008 A1* | 3/2011 | Srivastava | G06F 11/3466 717/128 |
| 2013/0160084 A1* | 6/2013 | Hansen | G06F 21/6227 726/4 |
| 2013/0254885 A1* | 9/2013 | Devost | G06F 21/56 726/23 |
| 2013/0268257 A1* | 10/2013 | Hu | G06F 17/5009 703/22 |
| 2013/0283373 A1* | 10/2013 | Zisapel | H04L 63/1441 726/22 |
| 2014/0308919 A1* | 10/2014 | Baranov | H04W 12/10 455/410 |
| 2015/0101049 A1 | 4/2015 | Lukacs et al. | |
| 2015/0121449 A1* | 4/2015 | CP | H04L 63/145 726/1 |
| 2015/0199521 A1* | 7/2015 | Bobzin | G06F 21/575 713/2 |
| 2016/0147564 A1* | 5/2016 | Marr | G06F 9/5027 718/103 |
| 2016/0224380 A1* | 8/2016 | Wang | G06F 9/546 |
| 2016/0357961 A1* | 12/2016 | Mulchandani | G06F 9/5038 |

* cited by examiner

PROCESS CATEGORIZATION USING CROWDSOURCING

CROSS-REFERENCE TO RELATED APPLICATION

This application claims the benefit of U.S. Provisional Application No. 62/171,072, filed Jun. 4, 2015, and titled "Process Categorization Using Crowdsourcing," which is incorporated by reference.

TECHNICAL FIELD

This disclosure generally describes techniques relating to computer security.

BACKGROUND

Computers may execute malicious processes that consume resources. For example, malicious processes may use main memory, processing power, or disk space of computers. The consumption of resources by malicious processes may make those resources unavailable for use by non-malicious processes, negatively impacting execution of non-malicious processes.

SUMMARY

To identify malicious processes, a computing device may collect and analyze data from multiple different client devices that are each running multiple processes. The client devices may be any type of device that can execute a process and may be devices that are managed by a single entity such as a corporate IT department. Upon execution of different processes, each client device identifies the resources requested by and allocated to a process. Before or during execution, each client device may also prompt a user for input regarding whether the process is safe to execute or not. Each client device provides the user input data, the resource allocation data, and data specifying the configuration of the client device, to a central computing device. The central computing device calculates, based on the user input data, the resource allocation data, and the configuration data, a risk score for each process. The risk score indicates a likelihood that a process is a malicious process. The central computing device uses the risk scores to identify a subset of processes, such as the processes with the highest risk scores. The central computing device performs additional processing on the subset of processes and adjusts the risk scores depending on whether the central computing device determines that a process is more likely or less likely to be malicious than what the risk score reflects. The additional processing may include executing the process, installing the process, or analyzing the code of the process. Once the central computing device adjusts the risk scores, the device compares the risk scores to a threshold and populates a whitelist and a blacklist. The central computing device provides the whitelist and blacklist to the client devices.

In some aspects, the subject matter described in this specification may be embodied in methods that may include the actions of receiving, from each of one or more client devices, data indicating resources allocated upon execution of each of one or more processes; receiving, from each of the one or more client devices, data indicating a configuration of the client device; receiving, from each of the one or more client devices, data indicating a user selection whether to execute each of the one or more processes; based on the resources allocated upon execution of each of the one or more processes, the configuration of each client device, and the user selections, determining, for each of the one or more processes, a risk score that reflects a likelihood that the process is a malicious process; based on the risk score, identifying a particular process; performing additional processing on the particular process; and based on the additional processing, determining an updated risk score for the particular process.

In another aspect, a method may include one or more of the operations described above. In yet another aspect, a computer-readable storage medium may be operable to cause a processor to perform one or more of the operations described above.

Implementations may include one or more of the following features. For example, the resources allocated upon execution of each of the one or more processes include an amount of memory; an amount of processor time; an amount of power; and network connections. The configuration of the client device includes a type and speed of each processor; a type and size of memory; a type and size of a hard drive; networking devices; and output devices. The action of determining, for each of the one or more processes, the risk score includes based on the configuration of the client device, determining resources that are available for allocation upon execution of the process; and determining the risk score based on a ratio of an amount of the resources allocated upon execution of the process to an amount of the resources that are available for allocation upon execution of the process. The action of determining, for each of the one or more processes, the risk score includes determining a number of the one or more client devices from which the data indicating the resources allocated upon execution of each of one or more processes is received; and determining the risk score based on the number of the one or more client devices from which the data indicating the resources allocated upon execution of each of one or more processes is received. The action of performing additional processing on the particular process includes executing the particular process; after executing the particular process, determining an amount of resources requested by the particular process; and terminating the particular process.

The actions further include determining that the updated risk score satisfies a threshold; based on determining that the updated risk score satisfies the threshold, adding the particular process to a blacklist; and providing, to each of the one or more client devices, the blacklist. The actions further include determining that the updated risk score does not satisfy a first threshold; determining that the updated risk score satisfies a second threshold based on determining that the updated risk score does not satisfy the first threshold and does satisfy a second threshold, adding the particular process to a whitelist; and providing, to each of the one or more client devices, the whitelist. The action of identifying the particular process includes identifying a process with a highest risk score. The actions further include receiving, from each of the one or more client devices, data indicating resources that are available for allocation upon execution of each of the one or more processes. The one or more client devices are comprised of client devices in one enterprise.

The details of one or more implementations of the subject matter described in this specification are set forth in the accompanying drawings and the description below. Other potential features, aspects, and advantages of the subject matter will become apparent from the description, the drawings, and the claims.

BRIEF DESCRIPTION OF DRAWINGS

Like reference symbols in the various drawings indicate like elements.

DETAILED DESCRIPTION

Figure 1:
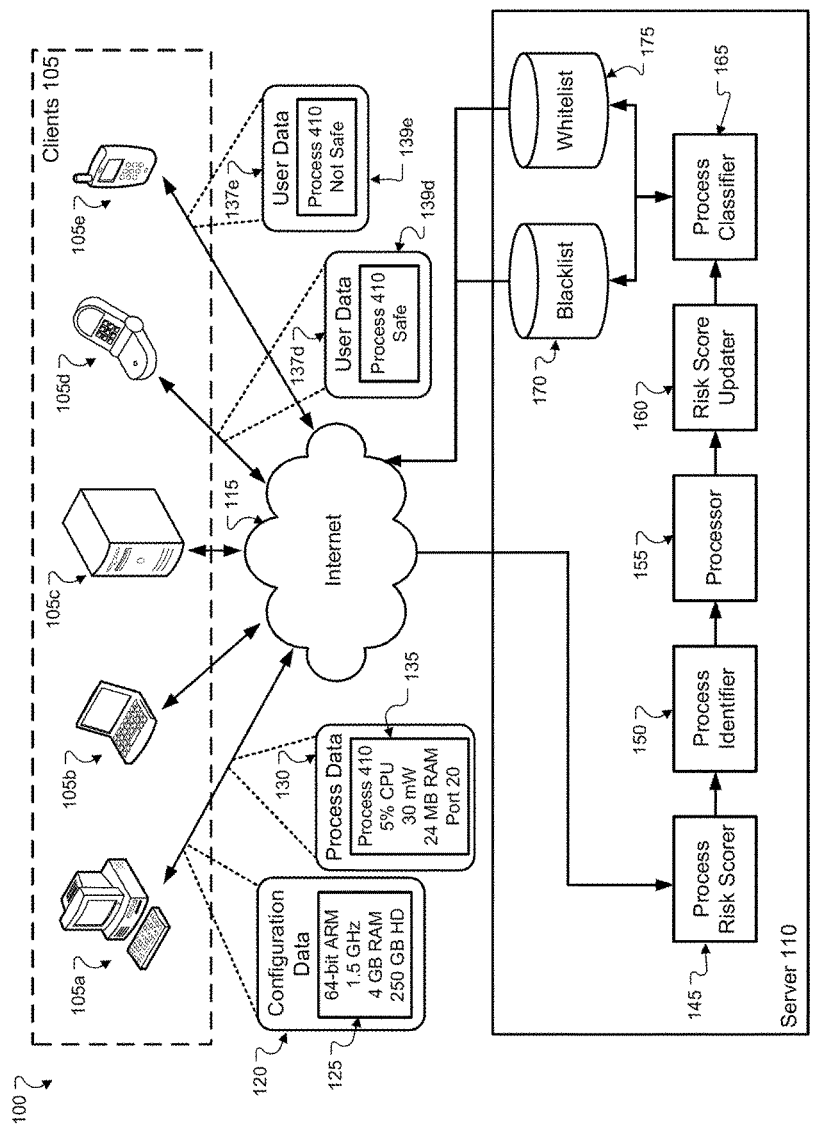
FIG. 1 illustrates an example system for process categorization using crowdsourcing.

FIG. 1 illustrates an example system 100 for process categorization using crowdsourcing. Briefly, and as described in further detail below, the client devices 105 provide data related to the execution on the client devices 105 of one or more processes. The server 110 receives the data related to the process execution and identifies malicious processes and non-malicious processes. The server 110 provides a list of the malicious and non-malicious processes back to the client devices 105.

In the example shown in FIG. 1, system 100 includes client devices 105 that communicate with the server 110. The client devices 105 may include any type of computing device. For example, the client device 105 may include desktop computers 105a and 105c, a laptop 105b, or mobile phones 105d and 105e. Additionally, the client devices 105 may include tablets, watches, or appliances. In some implementations, the client devices 105 are managed by a single entity such as a corporate information technology department or another type of enterprise. The corporate IT department may monitor the activities performed, install software on the client devices 105, or control the applications that a user installs or executes on the device. The client devices 105 may communicate with the server 110 through the internet 115 or through a local area network.

Each client device provides to the server the configuration data 120 of the device. The configuration data 120 may include the type of device, the model of the device, the type of CPU including the speed, number of cores, and cache size, the amount of RAM, the size of the hard drive, and the operating system. For example, client device 105a may provide data 125 to the server 110 indicating that the client device 105a includes a 64-bit ARM processor running at 1.5 GHz, 4 GB of RAM, a 250 GB hard drive, and is running Desktop OS.

Each client device provides process data 130 to the server 110. The client devices 105 may execute processes when a user opens an application. For example, a user may open a browser and the client device 105b executes the main browser process and two helper processes. The client device 105 may execute a process upon boot up, such as an operating system process. The client devices 105 may provide the process data 130 upon execution or installation of a process, after a period of time after execution or installation, at a predetermined time, or upon request by the server. The process data 130 may include, for each process, data related to CPU usage, memory usage, network packet inflow and outflow, power consumption, the owner of the process, the namespace the process was executed under, runtime, parent processes, child processes, processes that may be dependent on the process, or processes that are dependent on the process. For example, the client device 105a may provide data 135 to the server 110 indicating that the client device 105a executed process 410 and that processes 410 requested five percent of the CPU, twenty-four megabytes of RAM, and to send data on port 20, and consumed thirty milliwatts of power.

Each client device also provides user selection data to the server 110, as available. Upon execution or installation of a process, a client device may prompt a user of the client device whether or not to run the process. For example, the client device 105d may attempt to execute process 410 and prompt the user as to the safety of process 410. The user may select that the process 410 is safe. The client device 105d may then provide, to the server 110, user data 137d that includes data 139e indicating that the process 410 is safe. As another example, the client device 105e may attempt to execute process 410 and prompt the user as to the safety of process 410. The user may select that the process 410 is not safe. The client device 105e may then provide, to the server 110, user data 137e that includes data 139e indicating that the process 410 is not safe.

The process risk scorer 145 may determine risk scores for processes executing on the client devices 105. For example, the process risk scorer 145 may determine a first risk score for a first process executing on the client device 105b and a second risk score for a second process executing on the client device 105d. A risk score of a process may reflect a likelihood that the process is a malicious process. For example, an integral process of an operating system may have a risk score of 0% that reflects that the process has no likelihood of being a malicious process. In another example, a process that has never been seen before may have a risk score of 50% that reflects a moderate likelihood that the process is a malicious process. In yet another example, a known malicious process may have a risk score of 100% that reflects a high likelihood that the process is a malicious process.

The process risk scorer 145 may determine risk scores for each of the processes. For example, the process risk scorer 145 may determine a risk score for process 410 executing on client device 105a as well as client device 105e and for other processes executing on other client devices. The process risk scorer 145 may determine the risk score for a process based on comparing the process with previously scored processes. For example, the process risk scorer 145 may determine a name of a process executing on the client device 105b matches the name of a process stored in a table mapping process names to risk scores, and determine the risk score of the process executing on the client device 105b is the risk score in the table for the matching process name. In another example, the process risk scorer 145 may determine a hash of a process executing on the client device 105e matches the hash of a process stored in a table mapping hashes to risk scores, and determine the risk score of the process executing on the client device 105e is the risk score in the table for the matching hash.

In another example, the process risk scorer 145 may calculate a risk score for the processes based on characteristics of the process. For example, the process risk scorer 145 may calculate a risk score for a process based on memory usage of the process, read and write activity of the process, frequency of execution of the process, and other characteristics of the process.

In yet another example, the process risk scorer 145 may calculate a risk score for the process based on the feedback 137d and 137e received from users. For example, upon execution of process 410, the client device 105a may prompt the user as to whether or not to run the process. The user may select that the process 410 is safe to run or that the process 410 should not run. This selection along with the selections of other users of other client devices 105 regarding the execution of process 410 may be used to score the process 410. More users indicating that the process 410 is not safe to run will increase the risk score for processor 410, or more users indicating that the process 410 is safe to run will decrease the risk score for process 410.

In another example, the process risk scorer 145 may calculate a risk score for the process based on a number of client devices that attempt to execute the process. For example, a process that executes frequently may have a higher likelihood of being a malicious process. The process risk scorer 145 may maintain a list of common system processes that execute frequently. If a process executes as frequently as those system processes but the process risk scorer 145 does not match the process as a system process, then the processes risk scorer 145 may increase the risk score.

In some implementations, the data received from the client devices 105 is anonymized. The anonymized data prevents the sever 110 from associating a particular user with the data 120, 130, 137d or 137e. In some implementations, the client devices 105 remove any user identifying data before providing the data to the sever 110. In some implementations, the client devices 105 encrypt the user identifying data before providing the data to the server 110.

The process risk scorer 145 provides the list of processes and corresponding risk scores to the processes identifier 150. The process identifier 150 identifies processes for additional processing by the server 110. The process identifier 150 may identify the processes with the highest risk scores. For example, the process identifier 150 may identify the processes with the risk scores in the highest ten percent. The processes with the highest risk scores may be most likely to be malicious processes and by evaluating the processes again, the server 110 may increase a confidence of the risk scores. In some implementations, the process identifier 150 may identify the processes with the lowest risk scores. For example, the processes identifier 150 may identify the processes with the risk scores in the lowest five percent. The processes with the lowest risk scores may be least likely to be malicious processes and by evaluating the processes again, the server 110 may increase a confidence of the risk scores.

The process identifier 150 provides the identified process data to the processor 155. The processor 155 performs additional processing on the identified processes. The additional processing may include executing the process again in an isolated/quarantined/sandboxed environment or executing the process and quickly terminating the process. The processor 155 may execute a process and allow the process to request resources. Once the processor 155 receives a request from the process for resources, then the processor 155 will terminate the process. The processor 155 may also allow the process to run for a predetermined period of time. The processor 155 may monitor the resources requested by the process while the process runs. The processor 155 may allow the process to run until the process has completed executing and monitor the resources requested by the process during run time. In some implementations, the processor 155 may install the process. The processor 155 may allow the installation of the process to complete and monitor the resources requested during installation. The processor 155 may allow the process to being installation and request an initial allocation of resources and monitor the resources requested at the beginning of installation.

The processor 155 provides the additional data related to running the process to the risk score updater 160. The risk score updater 160 factors in the additional data related to running the process in calculating an updated risk score for the process. The risk score updater 160 may leave the risk score unchanged if the additional data from the processor 155 generally matches process data received from the client devices 105. The risk score updater 160 may increase the risk score if the additional data from the processor 155 suggests an increased likelihood that the process is a malicious process. The risk score updater 160 may decrease the risk score if the additional data from the processor 155 suggests a decreased likelihood that the process is a malicious process.

In some implementations, the risk score updater 160 may consider the configuration of the server 110 in calculating an updated risk score. For example, if the server 110 has 16 GB of RAM and the processes requests 10 MB of RAM, the server may compare that to the process to requesting 10 MB of RAM on client devices that include 1 GB of RAM. The risk score updater 160 may decrease the risk score because running the process on the server 110 suggest that the process does not request an amount of RAM that may negatively impact a device. As another example, if the server 110 has 8 GB of RAM and the processes requests 1 GB of RAM, the server may compare that to the process requesting 100 MB from a client device with 1 GB of RAM. The risk score updater 160 may increase the risk score because running the process on the server 110 suggests that the process requests an equal amount of RAM that may negatively impact devices with higher amounts of RAM that may be running more processes than devices with smaller amount of RAM.

In some implementations, the risk score updater 160 may consider input from another user. The user may observe the server executing the process and determine whether the process is safe or not safe. The risk score updater 160 may use the user's answer as a factor in updating the risk score. For example, the risk score updater 160 may increase the risk score by five percent or a predetermined, weighted percent if the user of the server indicates that the process is safe. The risk score updater 160 may decrease the risk score by five percent or a predetermined, weighted percent if the user of the server indicates that the process is not safe. In some implementations, the server user's indication of whether the process is safe or not is given more weight by the risk score updater 160 than users of the client devices 105 when updating the risk score.

The risk score updater 160 provides the updates risk scores to the process classifier 165. The process classifier 165 compares the risk score for each process to a threshold and based on that comparison adds the process to the blacklist 170 or the whitelist 175. The blacklist 170 includes data identifying processes that should not be run by a device, and the whitelist 175 includes data identifying processes that may be run by a device. As an example performed by the process classifier 165, the process classifier 165 may receive a risk score of 85 for process 410 and compare that risk score to a threshold of 80. Because the risk score of 85 is higher than the threshold score of 80, the processor classifier 165 may add the process 410 to the blacklist 170. As another example, the process classifier 165 may receive a risk score of 20 for process 443 and compare that risk score to the threshold of 80. Because the risk score of 20 is lower than the risk threshold of 80, the process classifier 165 may add the process 443 to the whitelist 175. In instances where the risk score is equal to the threshold, the process classifier 165 may use one or more tie breaking procedures. The process classifier 165 may add the process to the whitelist 175 if the server user determined that the process is safe. The process classifier 165 may add the process to the blacklist if the server user determined that the process is not safe. In instances where the server 110 receives data from client devices that are trusted, such as those administered by a corporate IT department, and client devices that are not trusted, such as those not administer by the corporate IT department, the process classifier 165 may weight the data received from the trusted devices more than the untrusted devices.

In some implementations, the process classifier 165 compares the risk score for each process to two or more thresholds. If the risk score does not satisfy any of the two or more thresholds, then the process remains unclassified and may be submitted for further processing. If the risk score satisfies at least one of the thresholds, then the process may be added to the whitelist 175 or the blacklist 170. For example, if the risk score is 50, the blacklist threshold is 80, and the whitelist threshold is 20, then the process may remain unclassified. If the risk score is 90, then the process is added to the blacklist 170. If the risk score is 10, then the process is added to the whitelist 175.

The risk score updater 160 may not update the risk scores for the processes not identified by the process identifier 150. In this instance, the process classifier 165 may add the processes that the process identifier 150 did not identify to the whitelist 175 and the blacklist 170 by comparing the risk score calculated by the process risk scorer 145 to the risk score threshold. For example, the process risk scorer 145 may calculate that the risk score for process 512 is 50. With that risk score, the process identifier 150 does not identify the process 512 as one for further processing. The process classifier may compare the risk score of 50 to the risk threshold of 80 and add the process 512 to the whitelist 175.

The risk score updater 160 may provide feedback to the process risk scorer 145. The feedback may indicate to the processes risk scorer 145 to adjust the calculation used to determine risk scores. The feedback may be based on the percentage of the risk scores that the risk score updater 160 updates. For example, if the risk score updater 160 updates the risk scores of eighty percent of the identified processes by adding an average of three points, then the risk score updater 160 may indicate to the process risk scorer 145 to adjust the risk scores by three point and indicate a common characteristic of the eighty percent of the identified processes such as using at least 30 mW of power.

The server 110 provides the blacklist 170 and whitelist 175 to the client devices 105. The client devices 105 receive the blacklist 170 and compares processes to the blacklist 170. If a client device matches a process that is currently running, installing, or starting to a process on the blacklist 170, then the client device may terminate the process. The client devices 105 receive the whitelist 175 and compares processes to the whitelist 175. If a client device matches a process that is currently running, installing, or starting to a process on the whitelist 175, then the client device allows the process to continue running. If a client device does not match a process to one on the whitelist 175 or blacklist 170, then the client device may provide process data 130 to the server 110.

Figure 2:
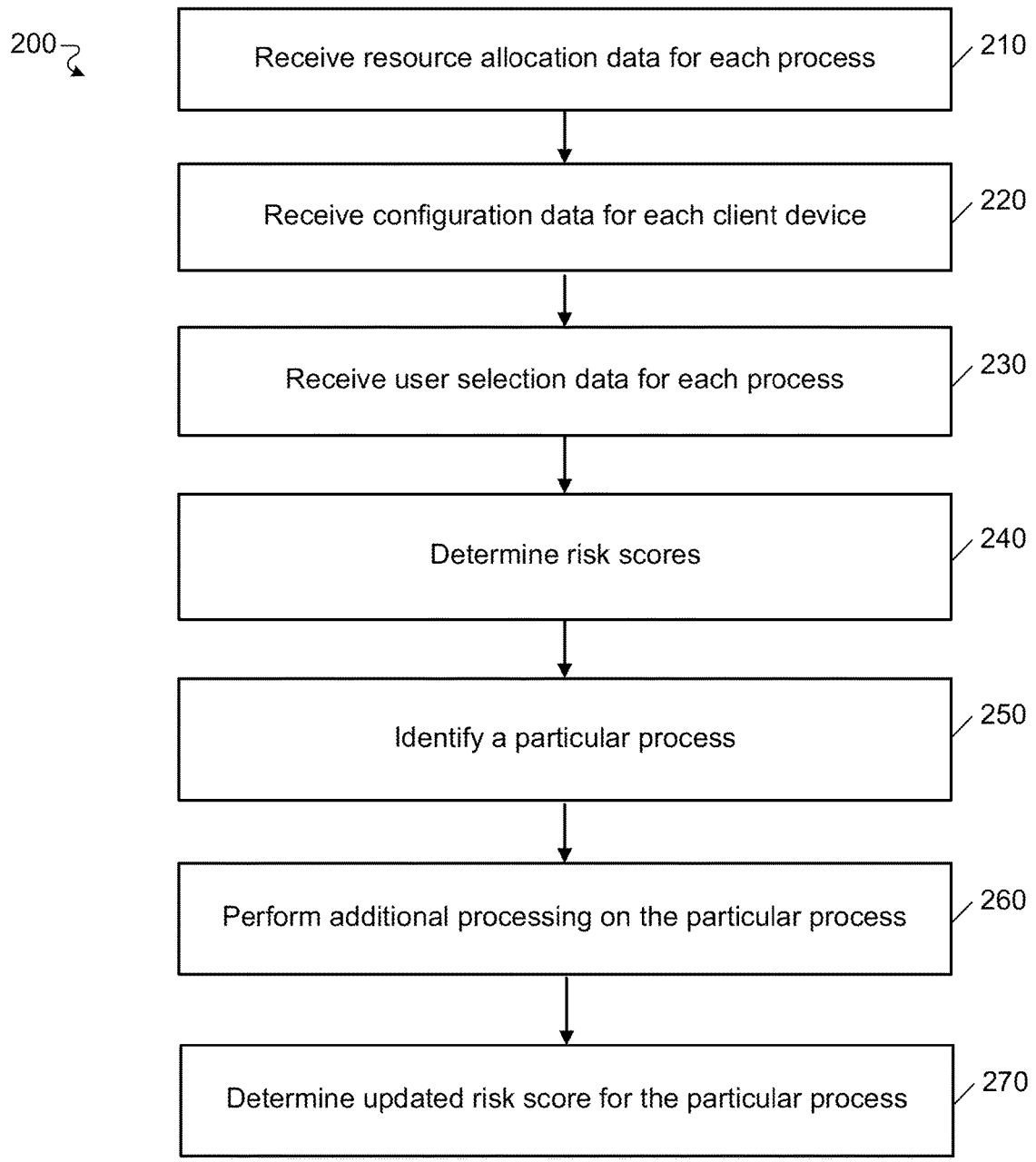
FIG. 2 is a flowchart of an example process for process categorization using crowdsourcing.

FIG. 2 is a flow chart of an example process 200 for process categorization using crowdsourcing. In general, the process 200 analyzes the processes to determine the likelihood that the process that are malicious and those that are not based on data received from multiple client devices. The process 200 will be described as being performed by a computer system comprising one or more computers, for example, the server 110 as shown in FIG. 1.

The system receives resource allocation data for each process from each client device (210). The resource allocation data specifies the resources requested by each process on each client device. The resources may include an amount of memory requested, an amount of processor time requested, an amount of power consumed running the process, or requested network connections. Each client device may collect the resource allocation data when the client device first executes the process or while the process is currently running. As an example, the resource allocation data may indicate that process 410 requested five percent of the CPU time, 24 MB of RAM, access to port 20, and the client device consumed 30 mW running the process 410.

In some implementations, the client devices are trusted devices. For system to trust the client devices, the client devices may be managed by a single entity such as a corporate IT department. Trusted client devices may have particular software installed on the devices that certify that the device is free of virus or any other malicious software. In some implementations, a trusted device should be operated by a trusted user to maintain the trusted status. A trusted user may be an employee of the company with the corporate IT department that manages the devices. A trusted user may also be a user that the system has verified in another way.

In some implementations, the system receives data indicating available resources when a process executes. Each time before a process executes, the client device may take a snapshot of the available resources or a trusted monitoring process may relay such details to the system. For example, when before process 410 executes, a laptop client may have 50% of the CPU available and 2 GB of RAM.

The system receives configuration data for each client device (220). The configuration data may identify a type of device, a manufacturer of the device, an operating system of the device, a type and speed of each processor, a type and size of memory, a type and size of a hard drive, any networking devices, and any output devices. For example, the configuration data may indicate that the device is manufactured by Laptop Company, running Laptop OS, has a 64-bit ARM processor running at 1.5 GHz, 4 MB of RAM, and a 250 GB hard drive.

The system receives user selection data for each process and for each client device (230). Before or while a process executes, the system may prompt the user to input whether the process is safe to execute or continue to execute. The client device passes this information onto the system. For example, as process 410 is about to execute, the client device prompts the user to indicate whether the process 410 is safe to execute or not safe to execute. The client device provides the user's selection of not safe to execute to the system.

The system determines a risk score for each process (240). The risk score indicates the likelihood that a process is a malicious process. The risk score is based on the resource allocation data, the configuration of the client device, and the user selection data. In some implementations, the risk score is based on the resources available when a client device executes a process. For example, if a process tries to request all or most of the available resources, then that may increase the risk score. In some implementations, the risk score is based on a ratio of the available resources to the resources requested by the process or a ratio of the resource configuration of the client device to the resources requested by the process.

The system identifies particular processes for additional processing (250). In some implementations, the particular processes may be ones with the highest risk scores. For example, the system may identify the processes with the risk scores in the top ten percent. As another example, the system may identify the processes with the risk scores in the lowest ten percent.

The system performs additional processing on the particular processes (260). The additional processing may consist of the server executing the particular processes. In some implementations, the server may run the particular processes and monitor the resources requested during runtime. In some implementations, the server may initiate the particular processes, monitor the resources requested just before the particular processes begin to run and then terminate the particular processes. In some implementations, the server may install the particular processes and monitor the resources requested during installation.

The system determines an updated risk score for the particular processes (270). The updated risk score is based on the initially calculated risk score and the system's additional processing. If the system determines that the risk score is too low for a process, then the system increases the risk score for that process. If the system determines that the risk score is too high for a process, then the system decreases the risk score for that process. In some implementations, the system compares the risk score to a risk score threshold. If the risk score is higher than the threshold, then the system adds the process to a blacklist. If the risk score is lower than the threshold, then the system adds the process to a whitelist. The system provides the whitelist and blacklist to the client devices.

Figure 3:
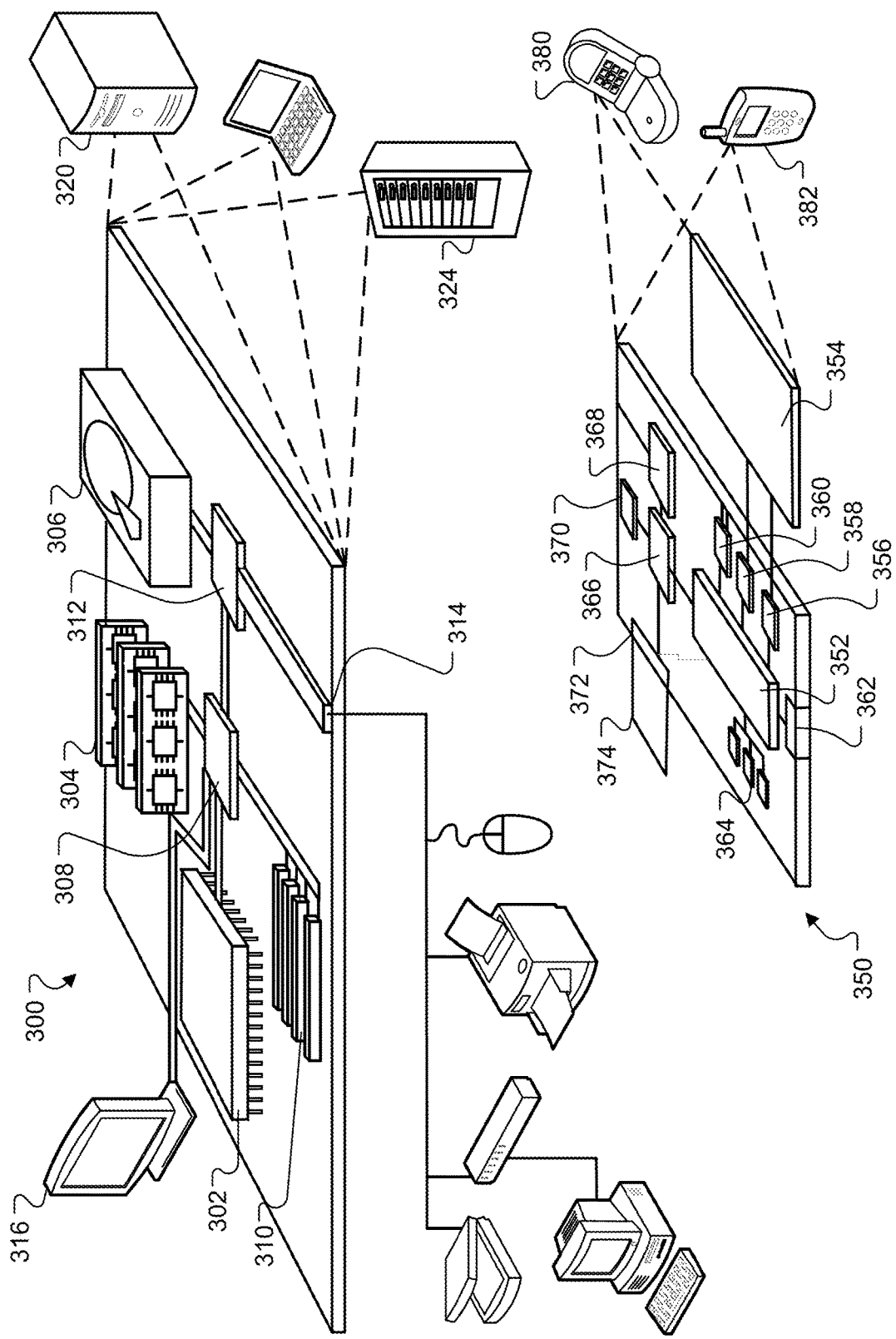
FIG. 3 is a schematic diagram of an example computer system.

FIG. 3 shows an example of a computing device 300 and a mobile computing device 350 that can be used to implement the techniques described here. The computing device 300 is intended to represent various forms of digital computers, such as laptops, desktops, workstations, personal digital assistants, servers, blade servers, mainframes, and other appropriate computers. The mobile computing device 350 is intended to represent various forms of mobile devices, such as personal digital assistants, cellular telephones, smart-phones, and other similar computing devices. The components shown here, their connections and relationships, and their functions, are meant to be examples only, and are not meant to be limiting.

The computing device 300 includes a processor 302, a memory 304, a storage device 306, a high-speed interface 308 connecting to the memory 304 and multiple high-speed expansion ports 310, and a low-speed interface 312 connecting to a low-speed expansion port 314 and the storage device 306. Each of the processor 302, the memory 304, the storage device 306, the high-speed interface 308, the high-speed expansion ports 310, and the low-speed interface 312, are interconnected using various busses, and may be mounted on a common motherboard or in other manners as appropriate. The processor 302 can process instructions for execution within the computing device 300, including instructions stored in the memory 304 or on the storage device 306 to display graphical information for a GUI on an external input/output device, such as a display 316 coupled to the high-speed interface 308. In other implementations, multiple processors and/or multiple buses may be used, as appropriate, along with multiple memories and types of memory. Also, multiple computing devices may be connected, with each device providing portions of the necessary operations (e.g., as a server bank, a group of blade servers, or a multi-processor system).

The memory 304 stores information within the computing device 300. In some implementations, the memory 304 is a volatile memory unit or units. In some implementations, the memory 304 is a non-volatile memory unit or units. The memory 304 may also be another form of computer-readable medium, such as a magnetic or optical disk.

The storage device 306 is capable of providing mass storage for the computing device 300. In some implementations, the storage device 306 may be or contain a computer-readable medium, such as a floppy disk device, a hard disk device, an optical disk device, or a tape device, a flash memory or other similar solid state memory device, or an array of devices, including devices in a storage area network or other configurations. Instructions can be stored in an information carrier. The instructions, when executed by one or more processing devices (for example, processor 302), perform one or more methods, such as those described above. The instructions can also be stored by one or more storage devices such as computer- or machine-readable mediums (for example, the memory 304, the storage device 306, or memory on the processor 302).

The high-speed interface 308 manages bandwidth-intensive operations for the computing device 300, while the low-speed interface 312 manages lower bandwidth-intensive operations. Such allocation of functions is an example only. In some implementations, the high-speed interface 308 is coupled to the memory 304, the display 316 (e.g., through a graphics processor or accelerator), and to the high-speed expansion ports 310, which may accept various expansion cards (not shown). In the implementation, the low-speed interface 312 is coupled to the storage device 306 and the low-speed expansion port 314. The low-speed expansion port 314, which may include various communication ports (e.g., USB, Bluetooth, Ethernet, wireless Ethernet) may be coupled to one or more input/output devices, such as a keyboard, a pointing device, a scanner, or a networking device such as a switch or router, e.g., through a network adapter.

The computing device 300 may be implemented in a number of different forms, as shown in the figure. For example, it may be implemented as a standard server 320, or multiple times in a group of such servers. In addition, it may be implemented in a personal computer such as a laptop computer 322. It may also be implemented as part of a rack server system 324. Alternatively, components from the computing device 300 may be combined with other components in a mobile device (not shown), such as a mobile computing device 350. Each of such devices may contain one or more of the computing device 300 and the mobile computing device 350, and an entire system may be made up of multiple computing devices communicating with each other.

The mobile computing device 350 includes a processor 352, a memory 364, an input/output device such as a display 354, a communication interface 366, and a transceiver 368, among other components. The mobile computing device 350 may also be provided with a storage device, such as a micro-drive or other device, to provide additional storage. Each of the processor 352, the memory 364, the display 354, the communication interface 366, and the transceiver 368, are interconnected using various buses, and several of the components may be mounted on a common motherboard or in other manners as appropriate.

The processor 352 can execute instructions within the mobile computing device 350, including instructions stored in the memory 364. The processor 352 may be implemented as a chipset of chips that include separate and multiple analog and digital processors. The processor 352 may provide, for example, for coordination of the other components of the mobile computing device 350, such as control of user interfaces, applications run by the mobile computing device 350, and wireless communication by the mobile computing device 350.

The processor 352 may communicate with a user through a control interface 358 and a display interface 356 coupled to the display 354. The display 354 may be, for example, a TFT (Thin-Film-Transistor Liquid Crystal Display) display or an OLED (Organic Light Emitting Diode) display, or other appropriate display technology. The display interface 356 may comprise appropriate circuitry for driving the display 354 to present graphical and other information to a user. The control interface 358 may receive commands from a user and convert them for submission to the processor 352. In addition, an external interface 362 may provide communication with the processor 352, so as to enable near area communication of the mobile computing device 350 with other devices. The external interface 362 may provide, for example, for wired communication in some implementations, or for wireless communication in other implementations, and multiple interfaces may also be used.

The memory 364 stores information within the mobile computing device 350. The memory 364 can be implemented as one or more of a computer-readable medium or media, a volatile memory unit or units, or a non-volatile memory unit or units. An expansion memory 374 may also be provided and connected to the mobile computing device 350 through an expansion interface 372, which may include, for example, a SIMM (Single In Line Memory Module) card interface. The expansion memory 374 may provide extra storage space for the mobile computing device 350, or may also store applications or other information for the mobile computing device 350. Specifically, the expansion memory 374 may include instructions to carry out or supplement the processes described above, and may include secure information also. Thus, for example, the expansion memory 374 may be provide as a security module for the mobile computing device 350, and may be programmed with instructions that permit secure use of the mobile computing device 350. In addition, secure applications may be provided via the SIMM cards, along with additional information, such as placing identifying information on the SIMM card in a non-hackable manner.

The memory may include, for example, flash memory and/or NVRAM memory (non-volatile random access memory), as discussed below. In some implementations, instructions are stored in an information carrier. that the instructions, when executed by one or more processing devices (for example, processor 352), perform one or more methods, such as those described above. The instructions can also be stored by one or more storage devices, such as one or more computer- or machine-readable mediums (for example, the memory 364, the expansion memory 374, or memory on the processor 352). In some implementations, the instructions can be received in a propagated signal, for example, over the transceiver 368 or the external interface 362.

The mobile computing device 350 may communicate wirelessly through the communication interface 366, which may include digital signal processing circuitry where necessary. The communication interface 366 may provide for communications under various modes or protocols, such as GSM voice calls (Global System for Mobile communications), SMS (Short Message Service), EMS (Enhanced Messaging Service), or MMS messaging (Multimedia Messaging Service), CDMA (code division multiple access), TDMA (time division multiple access), PDC (Personal Digital Cellular), WCDMA (Wideband Code Division Multiple Access), CDMA2000, or GPRS (General Packet Radio Service), among others. Such communication may occur, for example, through the transceiver 368 using a radio-frequency. In addition, short-range communication may occur, such as using a Bluetooth, WiFi, or other such transceiver (not shown). In addition, a GPS (Global Positioning System) receiver module 370 may provide additional navigation- and location-related wireless data to the mobile computing device 350, which may be used as appropriate by applications running on the mobile computing device 350.

The mobile computing device 350 may also communicate audibly using an audio codec 360, which may receive spoken information from a user and convert it to usable digital information. The audio codec 360 may likewise generate audible sound for a user, such as through a speaker, e.g., in a handset of the mobile computing device 350. Such sound may include sound from voice telephone calls, may include recorded sound (e.g., voice messages, music files, etc.) and may also include sound generated by applications operating on the mobile computing device 350.

The mobile computing device 350 may be implemented in a number of different forms, as shown in the figure. For example, it may be implemented as a cellular telephone 380. It may also be implemented as part of a smart-phone 582, personal digital assistant, or other similar mobile device.

Various implementations of the systems and techniques described here can be realized in digital electronic circuitry, integrated circuitry, specially designed ASICs (application specific integrated circuits), computer hardware, firmware, software, and/or combinations thereof. These various implementations can include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

These computer programs (also known as programs, software, software applications or code) include machine instructions for a programmable processor, and can be implemented in a high-level procedural and/or object-oriented programming language, and/or in assembly/machine language. As used herein, the terms machine-readable medium and computer-readable medium refer to any computer program product, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The term machine-readable signal refers to any signal used to provide machine instructions and/or data to a programmable processor.

To provide for interaction with a user, the systems and techniques described here can be implemented on a computer having a display device (e.g., a CRT (cathode ray tube) or LCD (liquid crystal display) monitor) for displaying information to the user and a keyboard and a pointing device (e.g., a mouse or a trackball) by which the user can provide input to the computer. Other kinds of devices can be used to provide for interaction with a user as well; for example, feedback provided to the user can be any form of sensory feedback (e.g., visual feedback, auditory feedback, or tactile feedback); and input from the user can be received in any form, including acoustic, speech, or tactile input.

The systems and techniques described here can be implemented in a computing system that includes a back end component (e.g., as a data server), or that includes a middleware component (e.g., an application server), or that includes a front end component (e.g., a client computer having a graphical user interface or a Web browser through which a user can interact with an implementation of the systems and techniques described here), or any combination of such back end, middleware, or front end components. The components of the system can be interconnected by any form or medium of digital data communication (e.g., a communication network). Examples of communication networks include a local area network (LAN), a wide area network (WAN), and the Internet.

The computing system can include clients and servers. A client and server are generally remote from each other and typically interact through a communication network. The relationship of client and server arises by virtue of computer programs running on the respective computers and having a client-server relationship to each other.

Although a few implementations have been described in detail above, other modifications are possible. For example, while a client application is described as accessing the delegate(s), in other implementations the delegate(s) may be employed by other applications implemented by one or more processors, such as an application executing on one or more servers. In addition, the logic flows depicted in the figures do not require the particular order shown, or sequential order, to achieve desirable results. In addition, other actions may be provided, or actions may be eliminated, from the described flows, and other components may be added to, or removed from, the described systems. Accordingly, other implementations are within the scope of the following claims.

What is claimed is:

1. A computer-implemented method comprising:
receiving, from each of one or more client devices, data indicating resources allocated upon execution of each of one or more processes;
receiving, from each of the one or more client devices, data indicating a configuration of the client device;
receiving, from each of the one or more client devices, data indicating a user selection whether to execute each of the one or more processes;
based on the resources allocated upon execution of each of the one or more processes, the configuration of each client device, and the user selections, determining, for each of the one or more processes, a risk score that reflects a likelihood that the process is a malicious process, comprising:
based on the configuration of the client device, determining resources that are available for allocation upon execution of the process; and
determining the risk score based on a ratio of an amount of the resources allocated upon execution of the process to an amount of the resources that are available for allocation upon execution of the process;
based on the risk score, identifying a particular process;
performing additional processing on the particular process; and
based on the additional processing, determining an updated risk score for the particular process.

2. The method of claim 1, wherein the resources allocated upon execution of each of the one or more processes comprises:
an amount of memory;
an amount of processor time;
an amount of power; and
network connections.

3. The method of claim 1, wherein the configuration of the client device comprises:
a type and speed of each processor;
a type and size of memory;
a type and size of a hard drive;
networking devices; and
output devices.

4. The method of claim 1, wherein determining, for each of the one or more processes, the risk score comprises:
determining a number of the one or more client devices from which the data indicating the resources allocated upon execution of each of one or more processes is received; and
determining the risk score based on the number of the one or more client devices from which the data indicating the resources allocated upon execution of each of one or more processes is received.

5. The method of claim 1, wherein performing additional processing on the particular process comprises:
executing the particular process;
after executing the particular process, determining an amount of resources requested by the particular process; and
terminating the particular process.

6. The method of claim 1, comprising:
determining that the updated risk score satisfies a threshold;
based on determining that the updated risk score satisfies the threshold, adding the particular process to a blacklist; and
providing, to each of the one or more client devices, the blacklist.

7. The method of claim 1, comprising:
determining that the updated risk score does not satisfy a first threshold;
determining that the updated risk score satisfies a second threshold;
based on determining that the updated risk score does not satisfy the first threshold and does satisfy a second threshold, adding the particular process to a whitelist; and
providing, to each of the one or more client devices, the whitelist.

8. The method of claim 1, wherein identifying the particular process comprises:
identifying a process with a highest risk score.

9. The method of claim 1, comprising:
receiving, from each of the one or more client devices, data indicating resources that are available for allocation upon execution of each of the one or more processes.

10. The method of claim 1, wherein the one or more client devices are comprised of client devices in one enterprise.

11. A system comprising:
one or more computers and one or more storage devices storing instructions that are operable, when executed by the one or more computers, to cause the one or more computers to perform operations comprising:
receiving, from each of one or more client devices, data indicating resources allocated upon execution of each of one or more processes;
receiving, from each of the one or more client devices, data indicating a configuration of the client device;
receiving, from each of the one or more client devices, data indicating a user selection whether to execute each of the one or more processes;

based on the resources allocated upon execution of each of the one or more processes, the configuration of each client device, and the user selections, determining, for each of the one or more processes, a risk score that reflects a likelihood that the process is a malicious process, comprising:
    based on the configuration of the client device, determining resources that are available for allocation upon execution of the process; and
    determining the risk score based on a ratio of an amount of the resources allocated upon execution of the process to an amount of the resources that are available for allocation upon execution of the process;

based on the risk score, identifying a particular process;
performing additional processing on the particular process; and
based on the additional processing, determining an updated risk score for the particular process.

12. The system of claim 11, wherein the resources allocated upon execution of each of the one or more processes comprises:
an amount of memory;
an amount of processor time;
an amount of power; and
network connections.

13. The system of claim 11, wherein performing additional processing on the particular process comprises:
executing the particular process;
after executing the particular process, determining an amount of resources requested by the particular process; and
terminating the particular process.

14. The system of claim 11, wherein the operations further comprise:
determining that the updated risk score satisfies a threshold;
based on determining that the updated risk score satisfies the threshold, adding the particular process to a blacklist; and
providing, to each of the one or more client devices, the blacklist.

15. The system of claim 11, wherein the operations further comprise:
determining that the updated risk score does not satisfy a threshold;
based on determining that the updated risk score does not satisfy the threshold, adding the particular process to a whitelist; and
providing, to each of the one or more client devices, the whitelist.

16. The system of claim 11, wherein identifying the particular process comprises:
identifying a process with a highest risk score.

17. The system of claim 11, wherein the operations further comprise:
receiving, from each of the one or more client devices, data indicating resources that are available for allocation upon execution of each of the one or more processes.

18. A non-transitory computer-readable medium storing software comprising instructions executable by one or more computers which, upon such execution, cause the one or more computers to perform operations comprising:
receiving, from each of one or more client devices, data indicating resources allocated upon execution of each of one or more processes;
receiving, from each of the one or more client devices, data indicating a configuration of the client device;
receiving, from each of the one or more client devices, data indicating a user selection whether to execute each of the one or more processes;
based on the resources allocated upon execution of each of the one or more processes, the configuration of each client device, and the user selections, determining, for each of the one or more processes, a risk score that reflects a likelihood that the process is a malicious process, comprising:
    based on the configuration of the client device, determining resources that are available for allocation upon execution of the process; and
    determining the risk score based on a ratio of an amount of the resources allocated upon execution of the process to an amount of the resources that are available for allocation upon execution of the process;

based on the risk score, identifying a particular process;
performing additional processing on the particular process; and
based on the additional processing, determining an updated risk score for the particular process.

* * * * *